United States Patent
Chen et al.

(10) Patent No.: US 9,172,413 B2
(45) Date of Patent: Oct. 27, 2015

(54) METHOD AND APPARATUS FOR PERFORMING WIRELESS COMMUNICATIONS WITH AID OF SUCCESSIVE DATA PROCESSING IN MULTIPLE ITERATIONS

(71) Applicant: MEDIATEK INC., Hsin-Chu (TW)

(72) Inventors: Wei-Jen Chen, Taipei (TW); Chia-Yu Chang, Taipei (TW); Po-Ying Chen, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 139 days.

(21) Appl. No.: 13/762,387

(22) Filed: Feb. 8, 2013

(65) Prior Publication Data

US 2014/0226764 A1 Aug. 14, 2014

(51) Int. Cl.
*H04B 1/10* (2006.01)

(52) U.S. Cl.
CPC .................................... *H04B 1/1081* (2013.01)

(58) Field of Classification Search
CPC ......... G06F 11/10; H03D 1/00; H03M 13/45; H04B 1/10; H04B 7/10; H04L 1/00; H04L 5/12; H04L 25/03; H04L 27/01; H04L 27/06; H04W 24/00
USPC .................. 370/252, 328; 375/262, 332, 341, 375/346–348; 714/752, 780
See application file for complete search history.

(56) References Cited

U.S. PATENT DOCUMENTS

| | | | |
|---|---|---|---|
| 2010/0284443 A1 | 11/2010 | Rosenqvist | |
| 2011/0051858 A1 | 3/2011 | Salvekar | |
| 2011/0051860 A1* | 3/2011 | Tang et al. | 375/341 |
| 2011/0051865 A1 | 3/2011 | Mergen | |
| 2012/0051470 A1* | 3/2012 | Schlegel et al. | 375/341 |
| 2013/0163704 A1* | 6/2013 | Liu et al. | 375/346 |
| 2013/0336377 A1* | 12/2013 | Liu et al. | 375/232 |

* cited by examiner

*Primary Examiner* — Sam K Ahn
*Assistant Examiner* — Shawkat M Ali
(74) *Attorney, Agent, or Firm* — Winston Hsu; Scott Margo

(57) ABSTRACT

A method for performing wireless communications and an associated apparatus are provided, where the method is applied to an electronic device. The method includes the steps of: receiving at least one data stream, wherein each data stream from the at least one data stream is transmitted from a wireless channel; in a first iteration, utilizing a Maximum Likelihood (ML) estimator to perform demapping processing on at least one portion of the at least one data stream to obtain Log-Likelihood Ratios (LLRs) of the first iteration and performing Turbo decoding according to the LLRs of the first iteration to generate resultant LLRs of the first Iteration; and in at least one following iteration, utilizing a Max A Posterior (MAP) estimator to perform demapping processing on at least one portion of the at least one data stream and performing Turbo decoding, successively, in order to cancel interference due to the wireless channel.

20 Claims, 8 Drawing Sheets $$\begin{bmatrix} y_1 \\ y_2 \end{bmatrix} = \begin{bmatrix} M_{11} & M_{12} \\ M_{21} & M_{22} \end{bmatrix} \begin{bmatrix} s_1 \\ s_2 \end{bmatrix} + \begin{bmatrix} n_1 \\ n_2 \end{bmatrix}$$

FIG. 2

METHOD AND APPARATUS FOR PERFORMING WIRELESS COMMUNICATIONS WITH AID OF SUCCESSIVE DATA PROCESSING IN MULTIPLE ITERATIONS

BACKGROUND

The present invention relates to removing interference for receivers (e.g. inter-stream interference for multiple input multiple output (MIMO) receivers or multi-path interference for general receivers) to enhance the performance, and more particularly, to a method for performing wireless communications, and to an associated apparatus.

According to the related art, a portable electronic device equipped with a touch screen (e.g., a multifunctional mobile phone, a personal digital assistant (PDA), a tablet, etc) may be very helpful to the user. In a situation where the portable electronic device is designed to have mobile phone functions, some problems may occur. For example, there may be a tradeoff between the performance and the compact size of the portable electronic device. Although some solutions are proposed the related art, it seems unlikely that they can resolve the problems without introducing side effects. For example, a conventional method is typically helpful only when one stream is acknowledged and the other stream is not acknowledged, while another conventional method directly cancels the interference without optimal sense on decoder input. In another example, another conventional method may consume a lot of computing power on decoder, where the timing constraint would be critical. Thus, a novel method is required for enhancing performance of an electronic device.

SUMMARY

It is therefore an objective of the claimed invention to provide a method for performing wireless communications, and to provide an associated apparatus, in order to solve the above-mentioned problems.

An exemplary embodiment of a method for performing wireless communications is provided, where the method is applied to an electronic device. The method comprises the steps of: receiving at least one data stream, wherein each data stream from the at least one data stream is transmitted from a wireless channel; in a first iteration, utilizing a Maximum Likelihood (ML) estimator to perform demapping processing on at least one portion of the at least one data stream to obtain Log-Likelihood Ratios (LLRs) of the first iteration and performing Turbo decoding according to the LLRs of the first iteration to generate resultant LLRs of the first Iteration; and in at least one following iteration, utilizing a Max A Posterior (MAP) estimator to perform demapping processing on at least one portion of the at least one data stream and performing Turbo decoding, successively, in order to cancel interference due to the wireless channel. More particularly, the step of utilizing the MAP estimator to perform demapping processing on at least one portion of the at least one data stream and performing Turbo decoding successively in order to cancel interference due to the wireless channel further comprises: in a specific iteration within the at least one following iteration, utilizing the MAP estimator to perform demapping processing on at least one portion of the at least one data stream according to resultant LLRs of at least one previous iteration to obtain LLRs of the specific iteration and performing Turbo decoding according to the LLRs of the specific iteration to generate resultant LLRs of the specific iteration.

An exemplary embodiment of an apparatus for performing wireless communications is provided, where the apparatus comprises at least one portion of an electronic device. The apparatus comprises a control circuit, and further comprises a signal processing module coupled to the control circuit. The control circuit is arranged to control operations of the apparatus and to control data flows of the apparatus, and the signal processing module is arranged to receive at least one data stream, wherein each data stream from the at least one data stream is transmitted from a wireless channel, and the signal processing module comprises an ML estimator, a MAP estimator, and a Turbo decoder. In addition, under control of the control circuit, in a first iteration, the ML estimator performs demapping processing on at least one portion of the at least one data stream to obtain LLRs of the first iteration and the Turbo decoder performs Turbo decoding according to the LLRs of the first iteration to generate resultant LLRs of the first Iteration. Additionally, under control of the control circuit, in at least one following iteration, the MAP estimator performs demapping processing on at least one portion of the at least one data stream and the Turbo decoder performs Turbo decoding, successively, in order to cancel interference due to the wireless channel. More particularly, in a specific iteration within the at least one following iteration, the MAP estimator performs demapping processing on at least one portion of the at least one data stream according to resultant LLRs of at least one previous iteration to obtain LLRs of the specific iteration and the Turbo decoder performs Turbo decoding according to the LLRs of the specific iteration to generate resultant LLRs of the specific iteration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates an equivalent channel model involved with the apparatus shown in FIG. 1 according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
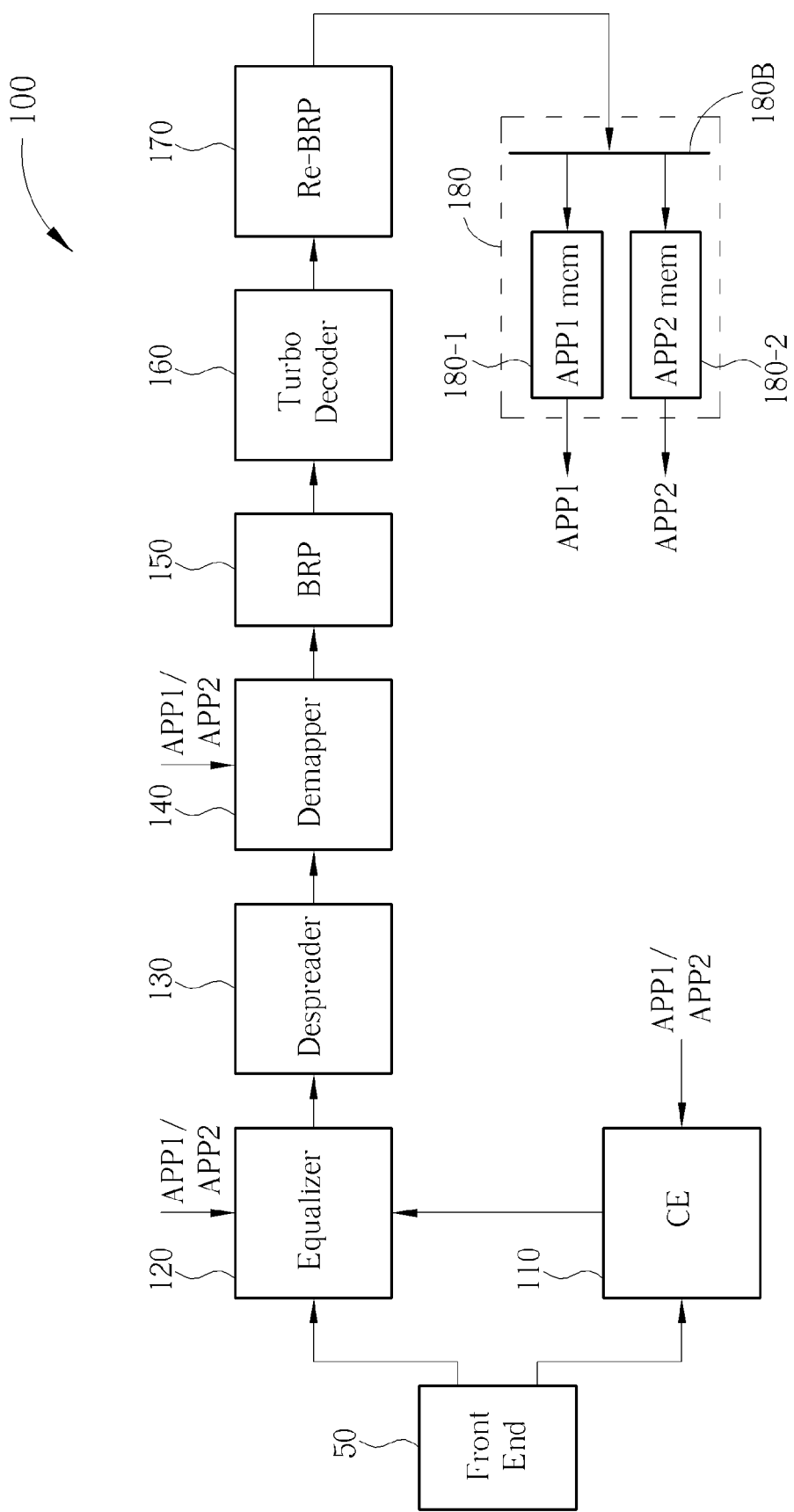
FIG. 1 is a diagram of an apparatus for performing wireless communications according to a first embodiment of the present invention.

Please refer to FIG. 1, which illustrates a diagram of an apparatus 100 for performing wireless communications according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a processing circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet, and a personal computer such as a laptop computer or desktop computer.

As shown in FIG. 1, the apparatus 100 comprises a control circuit (not shown), a front end circuit 50 (labeled "Front End"), and a signal processing module coupled to the control circuit. For example, the signal processing module may comprise a channel estimator 110 (labeled "CE"), an equalizer 120, a despreader 130, a demapper 140, a bit rate processing unit 150 (labeled "BRP"), a Turbo decoder 160, a bit rate processing unit 170 (labeled "Re-BRP", since it is the second bit rate processing unit along the processing path of the signal processing module), and a storage module 180, where the storage module 180 may comprise a bus 180B and a plurality of storage units 180-1 and 180-2 (labeled "APP1 mem" and "APP2 mem", respectively) such as respective memories (e.g. random access memories (RAMs)) for temporarily storing some processing results APP1 and APP2 of the signal processing module, respectively. This is for illustrative purposes only, and is not meant to be a limitation of the present invention. According to some variations of this embodiment, the storage units 180-1 and 180-2 can be implemented with different memory regions of the same memory. In practice, at least one portion (e.g. a portion or all) of the apparatus 100 can be implemented with at least one processor (e.g., at least one computer processor and/or at least one image processor) and/or can be implemented by using digital signal processing techniques. For example, the control circuit mentioned above can be implemented with the processor, and the signal processing module can be implemented by using an application specific integrated circuit (ASIC). In another example, the control circuit mentioned above and the signal processing module can be integrated into the same IC.

According to the embodiment shown in FIG. 1, the control circuit is arranged to control operations of the apparatus 100 and to control data flows of the apparatus 100, and the signal processing module is arranged to receive at least one data stream and successively perform signal processing on the aforementioned at least one data stream under control of the control circuit, where each data stream from the aforementioned at least one data stream is transmitted from a wireless channel. For example, in a situation where the processing result APP1 represents the processing result of an iteration I(n) (e.g., the index n may be an integer, and more particularly, a positive integer), the control circuit may control the processing result APP1 to be input into a portion of the apparatus 100 (e.g., the demapper 140, or each of the channel estimator 110, the equalizer 120, and the demapper 140) for performing some operations of the next iteration I(n+1), and then, in a situation where the processing result APP2 represents the processing result of the iteration I(n+1), the control circuit may control the processing result APP2 to be input into a portion of the apparatus 100 (e.g., the demapper 140, or each of the channel estimator 110, the equalizer 120, and the demapper 140) for performing some operations of the next iteration I(n+2), and so on. In another example, in a situation where the processing result APP2 represents the processing result of an iteration such as the iteration I(n), the control circuit may control the processing result APP2 to be input into a portion of the apparatus 100 (e.g., the demapper 140, or each of the channel estimator 110, the equalizer 120, and the demapper 140) for performing some operations of the next iteration I(n+1), and then, in a situation where the processing result APP1 represents the processing result of the iteration I(n+1), the control circuit may control the processing result APP1 to be input into a portion of the apparatus 100 (e.g., the demapper 140, or each of the channel estimator 110, the equalizer 120, and the demapper 140) for performing some operations of the next iteration I(n+2), and so on. As a result of the control of the control circuit (more particularly, the data flow control thereof), the apparatus 100 successively processes at least one portion of the aforementioned at least one data stream to cancel interference due to the wireless channel.

Please note that the operations of some of the respective components/units within the signal processing module can be considered to be reverse operations of the corresponding components/units within a transmitter (not shown) that transmits at least one signal carrying the aforementioned at least one data stream. More particularly, the transmitter may be used within a wireless communication system complying with some standards such as Code Division Multiple Access (CDMA) standards. For example, the transmitter may be implemented in a base station for transmitting data to a user terminal on a downlink, where this user terminal can be taken as an example of the electronic device mentioned above. In another example, the transmitter may be implemented in a user terminal for transmitting data to a base station on an uplink, where this base station can be taken as an example of the electronic device mentioned above. In practice, the data to be transmitted through the transmitter (i.e. the transmitter that transmits the aforementioned at least one signal carrying the aforementioned at least one data stream) may represent a plurality of signals dedicated to different user terminals, and each signal from the plurality of signals may be spread in a spreading unit of the transmitter by corresponding spreading code from a set of orthogonal spreading codes, where the plurality of spread signals dedicated to different user terminals may be summed up to generate a cumulative signal, and the cumulative signal is input into a mapper of the transmitter. In addition, the mapper may map the data carried by the cumulative signal onto constellation points to generate a symbol stream, where the mapping operation may be performed by using some modulation constellation, such as Binary Phase-Shift Keying (BPSK), Quadrature Phase-Shift Keying (QPSK), 8 Phase-Shift Keying (8PSK), Quadrature Amplitude Modulation (QAM), etc., and the symbol stream may be further processed by some other units within the transmitter, such as a preamble insertion unit of the transmitter. Additionally, the preamble insertion unit is typically arranged to insert a preamble sequence at the beginning of the symbol stream to generate a corresponding data stream, where the preamble may be detected at a receiver such as at least one portion (e.g. a portion or all) of the architecture shown in FIG. 1, and the output of the preamble insertion unit may be input into a radio frequency (RF) front end of the transmitter, for being up-converted to a desired transmit frequency band by this RF front end. As a result, the transmitter may utilize at least one antenna to transmit at least one corresponding signal over a wireless channel such as that mentioned above.

According to this embodiment, a portion of the apparatus 100, such as the front end circuit 50, may down-convert at least one received signal (which is received through at least one receiver antenna of the electronic device) and detect the preamble under control of the control circuit mentioned above, and based upon the preamble, the apparatus 100 may perform time and frequency synchronization, channel estimation, equalization, and channel decoding. For example, under control of the control circuit, the channel estimator 110 and the equalizer 120 may perform a channel estimation operation and an equalization operation, respectively. In addition, the despreader 130 may perform a despreading operation, which is typically a reverse operation of the spreading operation performed by the spreading unit of the transmitter, and the demapper 140 may perform a demapping operation, which is typically a reverse operation of the mapping operation performed by the mapper of the transmitter. Additionally, the Turbo decoder 160 may perform a Turbo decoding operation, where the Turbo decoding operation is well known in the related art, and therefore is not described in detail here. Regarding the bit rate processing unit 150 and the bit rate processing unit 170, the control circuit mentioned above is capable of selectively enabling or disabling at least one of the bit rate processing unit 150 and the bit rate processing unit 170. In a situation where the control circuit enables the bit rate processing unit 150 and the bit rate processing unit 170, the bit rate processing unit 150 may perform a first bit rate processing operation to convert the original bit rate of its input into a suitable bit rate for the Turbo decoder 160, such as a target bit rate, and the bit rate processing unit 170 may perform a second bit rate processing operation to convert the bit rate of its input (e.g. the target bit rate) into a suitable bit rate for the next stage, such as the original bit rate or another bit rate. In a situation where the control circuit disables the bit rate processing unit 150 and the bit rate processing unit 170, the bit rate processing unit 150 and the bit rate processing unit 170 may simply bypass their inputs, respectively.

FIG. 2 illustrates an equivalent channel model involved with the apparatus 100 shown in FIG. 1 according to an embodiment of the present invention. The notations $s_1$ and $s_2$ represent a set of symbols to be converted by at least one equivalent channel matrix such as that shown in FIG. 2, where any of the indexes i and j of the elements $\{M_{i,j}\}$ within the matrix M (e.g. the elements $M_{1,1}$, $M_{1,2}$, $M_{2,1}$, and $M_{2,2}$ shown in FIG. 2) can be a positive integer falling within the range of the interval [1, 2]. In addition, the notations $n_1$ and $n_2$ represent the noise, and the notations $y_1$ and $y_2$ represent a set of symbols, which can be regarded as interfered or distorted symbols in this equivalent channel model.

According to this embodiment, the apparatus 100 can be utilized for removing interference for one or more receivers, such as inter-stream interference for a multiple input multiple output (MIMO) receiver or multi-path interference for a general receiver. For better comprehension, the MIMO receiver can be taken as an example of the receiver under consideration. In a situation where the symbols $\{s_1\}$ and $\{s_2\}$ belong to two data streams such as a first stream and a second stream, respectively, in each iteration, the apparatus 100 may focus its computing/processing power on only one stream and update the storage units 180-1 and 180-2 successively, where the processing results APP1 and APP2 correspond to the first stream and the second stream, respectively. For example, based upon the equivalent channel model shown in FIG. 2, the apparatus 100 may first process (more particularly, decode) the first stream to obtain the processing result APP1, and then process (more particularly, decode) the second stream according to the processing result APP1 to obtain the processing result APP2, and then process (more particularly, decode) the first stream according to the processing result APP2 to obtain the latest version of the processing result APP1, and then process (more particularly, decode) the second stream according to the latest version of the processing result APP1 to obtain the latest version of the processing result APP2, and then process (more particularly, decode) the first stream according to the latest version of the processing result APP2 to obtain the latest version of the processing result APP1, and so on. In another example, based upon the equivalent channel model shown in FIG. 2, the apparatus 100 may first process (more particularly, decode) the second stream to obtain the processing result APP2, and then process (more particularly, decode) the first stream according to the processing result APP2 to obtain the processing result APP1, and then process (more particularly, decode) the second stream according to the processing result APP1 to obtain the latest version of the processing result APP2, and then process (more particularly, decode) the first stream according to the latest version of the processing result APP2 to obtain the latest version of the processing result APP1, and then process (more particularly, decode) the second stream according to the latest version of the processing result APP1 to obtain the latest version of the processing result APP2, and so on.

In practice, the signal processing module may comprise a Maximum Likelihood (ML) estimator and a Max A Posterior (MAP) estimator (not shown in FIGS. 1-2). For example, both of the ML estimator and the MAP estimator can be implemented within the demapper 140. In the first iteration such as the iteration 41), the control circuit utilizes the ML estimator to perform demapping processing (i.e. the demapping operation mentioned above), where the aforementioned demapping processing of the first iteration I(1) is performed according to an equivalent channel model such as that shown in FIG. 2. In the following iterations such as the iterations I(2), I(3), I(4), . . . , etc., the control circuit utilizes the MAP estimator to perform demapping processing, where the aforementioned demapping processing of any of the following iterations I(2), I(3), I(4), . . . , etc. is typically performed according to the same equivalent channel model as that utilized in the first iteration I(1). According to this embodiment, the most gain of MAP comes from the removal of cross interference, so the architecture shown in FIG. 1, with the equivalent channel model shown in FIG. 2 being applied, will not suffer a lot if the apparatus 100 successively processes the streams. Please note that, during decoding the Log-Likelihood Ratio (LLR) $LLR_n$ of the symbol $s_1$ based upon the equivalent channel model shown in FIG. 2, knowing LLRs of the symbol $s_2$ will be much more helpful than knowing other LLRs of the symbol $s_1$. For example, if the noise $n_1$ represent white noise and the symbol $s_1$ complies with QPSK standards, knowing the so-called I-part of the symbol $s_1$ is not helpful during decoding the so-called Q-part of the symbol $s_1$.

Figure 3:
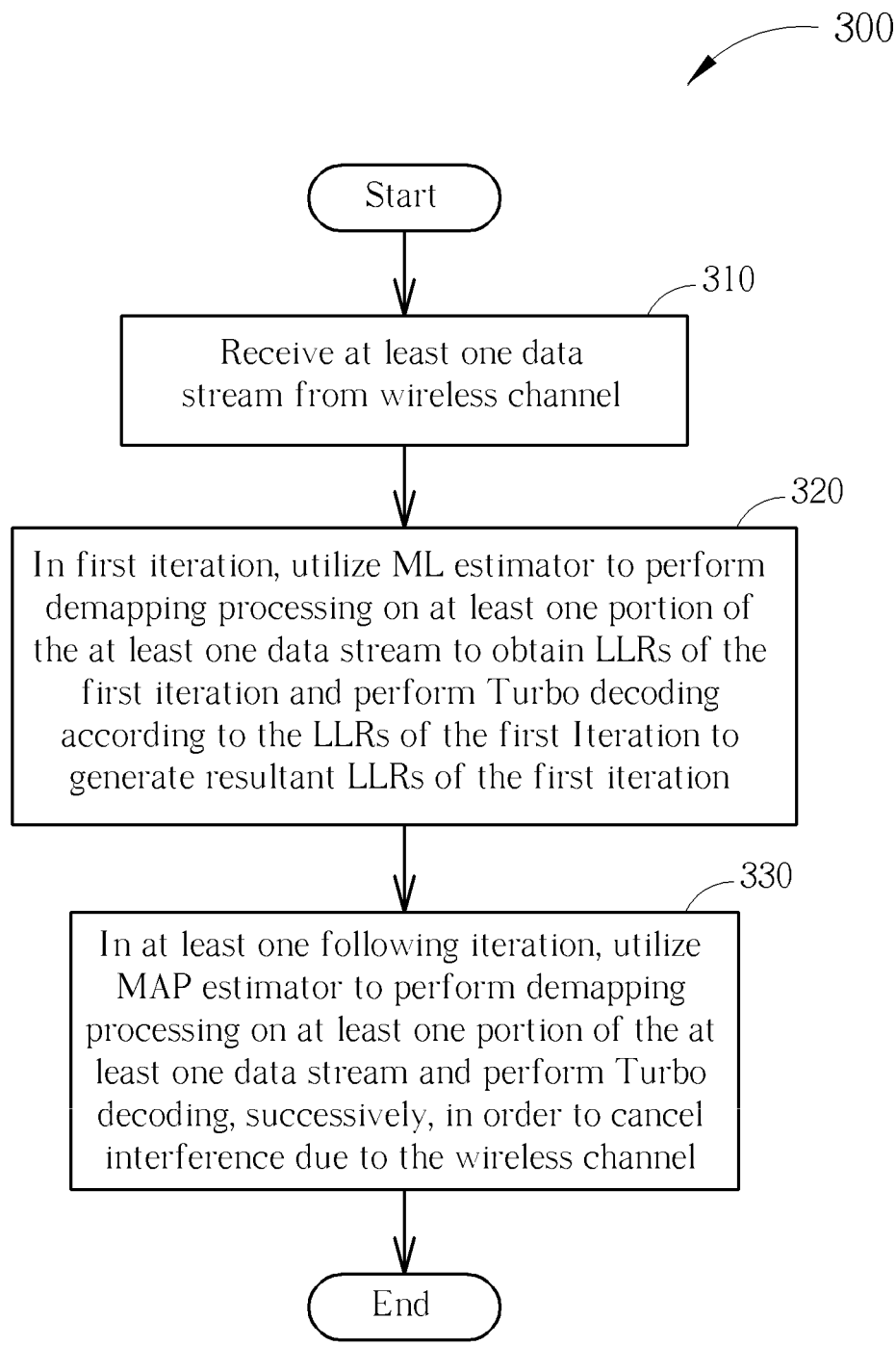
FIG. 3 illustrates a flowchart of a method for performing wireless communications according to an embodiment of the present invention.

FIG. 3 illustrates a flowchart of a method 300 for performing wireless communications according to an embodiment of the present invention. The method shown in FIG. 3 can be applied to the apparatus 100 shown in FIG. 1. The method is described as follows.

In Step 310, the signal processing module receives the aforementioned at least one data stream from at least one wireless channel. For example, the signal processing module may receive two data streams simultaneously transmitted from at least one transmitter, where the two data streams are received using at least one receiver, respectively. In addition, the transmitting path or receiving path can comprise one or multiple antennas depending on design criteria. In another example, the signal processing module may receive one data stream using two receiver antennas of at least one receiver.

In Step 320, under control of the control circuit, in the first iteration such as the iteration I(1), the apparatus 100 (more particularly, the control circuit) utilizes the ML estimator to perform demapping processing on at least one portion of the aforementioned at least one data stream to obtain LLRs of the first iteration I(1) and utilizes the Turbo decoder 160 to perform Turbo decoding according to the LLRs of the first Iteration I(1) to generate resultant LLRs of the first iteration I(1). Please note that the resultant LLRs generated by the signal processing module in any iteration (e.g., the first iteration I(1), or any of the following iterations I(2), I(3), I(4), . . . , etc.) can also be referred to as the A Posterior Probabilities (APPs).

More particularly, in the first iteration I(1), before performing Turbo decoding, the control circuit utilizes the bit rate processing unit 150 to perform bit rate processing (i.e. the aforementioned first bit rate processing operation of the bit rate processing unit 150) to convert the original bit rate of the LLRs of the first iteration I(1) into the target bit rate for performing Turbo decoding. In addition, in the first iteration I(1), after performing Turbo decoding, the control circuit utilizes the bit rate processing unit 170 to perform bit rate processing (i.e. the aforementioned second bit rate processing operation of the bit rate processing unit 170) to convert the target bit rate into the original bit rate for the resultant LLRs of the first iteration I(1). Please note that the resultant LLRs of the first iteration I(1) can be taken as an example of one of the processing results APP1 and APP2. For example, in a situation where the first iteration I(1) is utilized for decoding the first stream, the resultant LLRs of the first iteration I(1) can be regarded as the processing results APP1. In another example, in a situation where the first iteration I(1) is utilized for decoding the second stream, the resultant LLRs of the first iteration I(1) can be regarded as the processing results APP2.

In Step 330, under control of the control circuit, in at least one following iteration such as the iterations I(2), I(3), I(4), . . . , etc., the apparatus 100 (more particularly, the control circuit) utilizes the MAP estimator to perform demapping processing on at least one portion of the aforementioned at least one data stream and utilizes the Turbo decoder 160 to perform Turbo decoding, successively, in order to cancel interference due to the wireless channel. According to this embodiment, in a specific iteration $I(n_s)$ within the aforementioned at least one following iteration (e.g., any of the aforementioned iterations I(2), I(3), I(4), . . . , etc., with the notation $n_s$ representing a positive integer that is greater than one), under control of the control circuit, the MAP estimator performs demapping processing on at least one portion of the aforementioned at least one data stream according to resultant LLRs of at least one previous iteration to obtain LLRs of the specific iteration $I(n_s)$ and the Turbo decoder 160 performs Turbo decoding according to the LLRs of the specific iteration $I(n_s)$ to generate resultant LLRs of the specific iteration $I(n_s)$. For example, in a situation where the specific iteration $I(n_s)$ represents the second iteration I(2) following the first iteration I(1), the aforementioned at least one previous iteration represents the first iteration I(1). In another example, in a situation where the specific iteration $I(n_s)$ represents the third iteration I(3) following the second iteration I(2), the aforementioned at least one previous iteration may comprise the second iteration I(2). In another example, in a situation where the specific iteration $I(n_s)$ represents the third iteration I(3) following the second iteration I(2), the aforementioned at least one previous iteration may comprise the second iteration I(2) and the first iteration I(1). In another example, in a situation where the specific iteration $I(n_s)$ represents an iteration that differs from the second iteration I(2), such as an iteration I(n') within the iterations I(3), I(4), . . . , etc. (where n'>2), the aforementioned at least one previous iteration comprises the previous two iterations I(n'−1) and I(n'−2) with respect to the specific iteration $I(n_s)$ such as the iteration I(n').

More particularly, in the specific iteration $I(n_s)$, before performing Turbo decoding, the control circuit utilizes the bit rate processing unit 150 to perform bit rate processing to convert the original bit rate of the LLRs of the specific iteration $I(n_s)$ into the target bit rate for performing Turbo decoding. In addition, in the specific iteration $I(n_s)$, after performing Turbo decoding, the control circuit utilizes the bit rate processing unit 170 to perform bit rate processing to convert the target bit rate into the bit rate for the resultant LLRs of the specific iteration $I(n_s)$. Please note that the resultant LLRs of the specific iteration $I(n_s)$ can be taken as an example of one of the processing results APP1 and APP2. For example, in a situation where the specific iteration $I(n_s)$ is utilized for decoding the first stream, the resultant LLRs of the specific iteration $I(n_s)$ can be regarded as the processing results APP1. In another example, in a situation where the specific iteration $I(n_s)$ is utilized for decoding the second stream, the resultant LLRs of the specific iteration $I(n_s)$ can be regarded as the processing results APP2.

According to this embodiment, in the second iteration I(2), the apparatus 100 (more particularly, the control circuit) utilizes the MAP estimator to perform demapping processing on at least one portion of the aforementioned at least one data stream according to the resultant LLRs of the first iteration I(1) to obtain LLRs of the second iteration I(2) and utilizes the Turbo decoder 160 to perform Turbo decoding according to the LLRs of the second iteration I(2) to generate resultant LLRs of the second iteration I(2). Then, in the third iteration I(3), the apparatus 100 (more particularly, the control circuit) utilizes the MAP estimator to perform demapping processing on at least one portion of the aforementioned at least one data stream according to the resultant LLRs of the second iteration I(2) to obtain LLRs of the third iteration I(3) and utilizes the Turbo decoder 160 to perform Turbo decoding according to the LLRs of the third iteration I(3) to generate resultant LLRs of the third iteration I(3). Afterward, in the fourth iteration I(4), the apparatus 100 (more particularly, the control circuit) utilizes the MAP estimator to perform demapping processing on at least one portion of the aforementioned at least one data stream according to the resultant LLRs of the third iteration I(3) to obtain LLRs of the fourth iteration I(4) and utilizes the Turbo decoder 160 to perform Turbo decoding according to the LLRs of the fourth iteration I(4) to generate resultant LLRs of the fourth iteration I(4). And similar operations can be performed successively. This is for illustrative purposes only, and is not meant to be a limitation of the present invention. Please note that the aforementioned at least one previous iteration may comprise multiple previous iterations.

For example, in the fourth iteration I(4), the apparatus 100 (more particularly, the control circuit) may utilize the MAP estimator to perform demapping processing on at least one portion of the aforementioned at least one data stream according to the resultant LLRs of the third iteration I(3) and according to the resultant LLRs of the second iteration I(2) to obtain the LLRs of the fourth iteration I(4). In another example, in the third iteration I(3), the apparatus 100 (more particularly, the control circuit) may utilize the MAP estimator to perform demapping processing on at least one portion of the aforementioned at least one data stream according to the resultant LLRs of the second iteration I(2) and according to the resultant LLRs of the first iteration I(1) to obtain the LLRs of the third iteration I(3).

Figure 4:
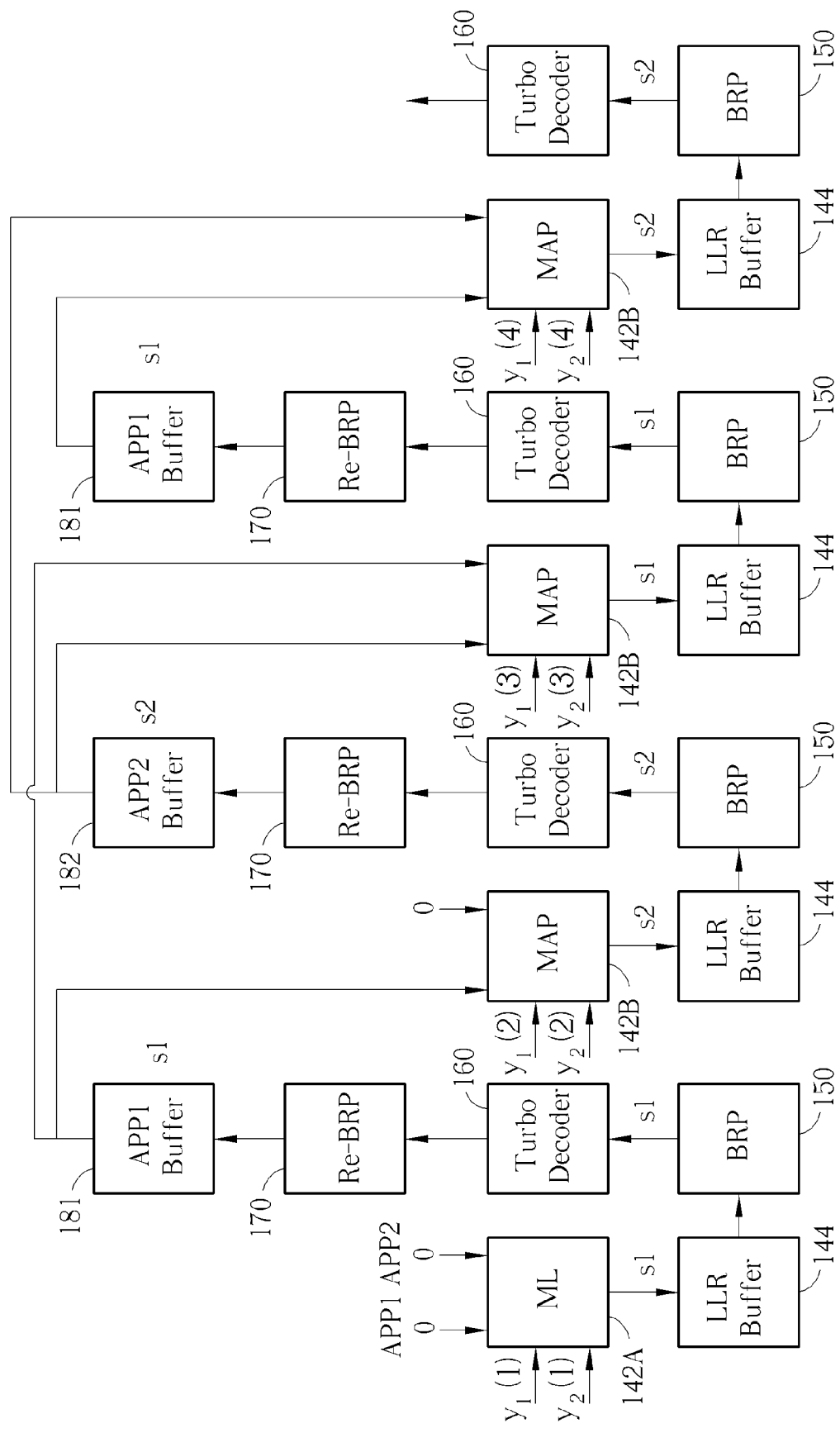
FIG. 4 illustrates some data flows of first few iterations involved with the method shown in FIG. 3 according to an embodiment of the present invention.

FIG. 4 illustrates some data flows of first few iterations (e.g. the iterations I(1), I(2), I(3), I(4), . . . ) involved with the method 300 shown in FIG. 3 according to an embodiment of the present invention. According to this embodiment, the ML estimator 142A (labeled "ML", for brevity) shown in FIG. 4 can be taken as an example of the ML estimator mentioned above, and the MAP estimator 142B (labeled "MAP", for brevity) shown in FIG. 4 can be taken as an example of the MAP estimator mentioned above. In addition to the ML estimator 142A and the MAP estimator 142B, the demapper 140 may further comprise an LLR buffer 144 for temporarily storing one or more LLRs generated by any of the ML estimator 142A and the MAP estimator 142B. The buffers 181 and 182 shown in FIG. 4 can be taken as examples of the storage units 180-1 and 180-2, respectively. For better comprehension, the notations s1 and s2 are utilized for illustrating different data flows, such as the data flow of the aforementioned first stream and the data flow of the aforementioned second stream, respectively. Thus, the left two columns of blocks shown in FIG. 4 correspond to the first iteration I(1), and the next two columns of blocks shown in FIG. 4 correspond to the second iteration I(2), and so on.

According to this embodiment, in the iterations, the apparatus 100 (more particularly, the demapper 140, under control of the control circuit) may utilize different sets of symbols (e.g. $(y_1(1), y_2(1))$, $(y_1(2), y_2(2))$, $(y_1(3), y_2(3))$, $(y_1(4), y_2(4))$, . . . , etc.) to perform demapping processing, respectively. More particularly, in the specific iteration $I(n_s)$, a sub-module of the signal processing module (e.g., the sub-module comprising the channel estimator 110, the equalizer 120, and the despreader 130) performs a pre-processing operation on the resultant LLRs of the aforementioned at least one previous iteration to generate a pre-processed result, for use of performing demapping processing of the specific iteration $I(n_s)$, where the pre-processed result represents a set of symbols $(y_1, y_2)$ within the different sets of symbols.

As shown in FIG. 4, the sets of symbols $(y_1(1), y_2(1))$, $(y_1(2), y_2(2))$, $(y_1(3), y_2(3))$, $(y_1(4), y_2(4))$, . . . correspond to the iterations I(1), I(2), I(3), I(4), . . . , respectively. For each of the ML estimator 142A and the MAP estimator 142B, the other two inputs depicted on the topmost thereof, such as the two downward arrows pointing to any of them, are utilized for receiving the processing results APP1 and APP2. According to this embodiment, the processing results APP1 and APP2 of the first iteration I(1) are supposed to be zero, and the processing result APP2 of the second iteration I(2) is supposed to be zero. This is for illustrative purposes only, and is not meant to be a limitation of the present invention. According to a variation of this embodiment, in the specific iteration $I(n_s)$, the MAP estimator 142B utilizes only the processing result of the latest iteration $I(n_s-1)$ within the aforementioned at least one previous iteration (e.g. one of the processing results APP1 and APP2, depending on which of them is latest updated), rather than both of the processing results APP1 and APP2. For example, the right one of the two downward arrows pointing to the MAP estimator 142B of this variation is typically arranged to receive a zero input.

In the embodiment shown in FIG. 4, the iterations can be performed with respect to the whole of the signal processing module, such as the channel estimator 110 through to the storage module 180. This is for illustrative purposes only, and is not meant to be a limitation of the present invention. According to some variations of this embodiment, in the iterations, the apparatus 100 (more particularly, the demapper 140, under control of the control circuit) may utilize the same set of symbols to perform demapping processing, respectively. For example, under control of the control circuit, the demapper 140 receives the same set of symbols utilized in the first iteration 41), for use of performing demapping processing of the specific iteration $I(n_s)$. Thus, the iterations can be performed with respect to a portion of the signal processing module, such as the demapper 140 through to the storage module 180, where the channel estimator 110, the equalizer 120, and the despreader 130 can be temporarily inactive under control of the control circuit, and the sets of symbols $(y_1(2), y_2(2))$, $(y_1(3), y_2(3))$, $(y_1(4), y_2(4))$, . . . respectively corresponding to the iterations I(2), I(3), I(4), . . . can be the same as the set of symbols $(y_1(1), y_2(1))$ corresponding to the iterations I(1).

Regarding the pre-processing operation performed by the aforementioned sub-module of the signal processing module (e.g., the sub-module comprising the channel estimator 110, the equalizer 120, and the despreader 130), the iterations can be performed with respect to the whole of the signal processing module, such as the channel estimator 110 through to the storage module 180, and during the iterations, the sub-module comprising the channel estimator 110, the equalizer 120, and the despreader 130 can be active under control of the control circuit.

Figure 5:
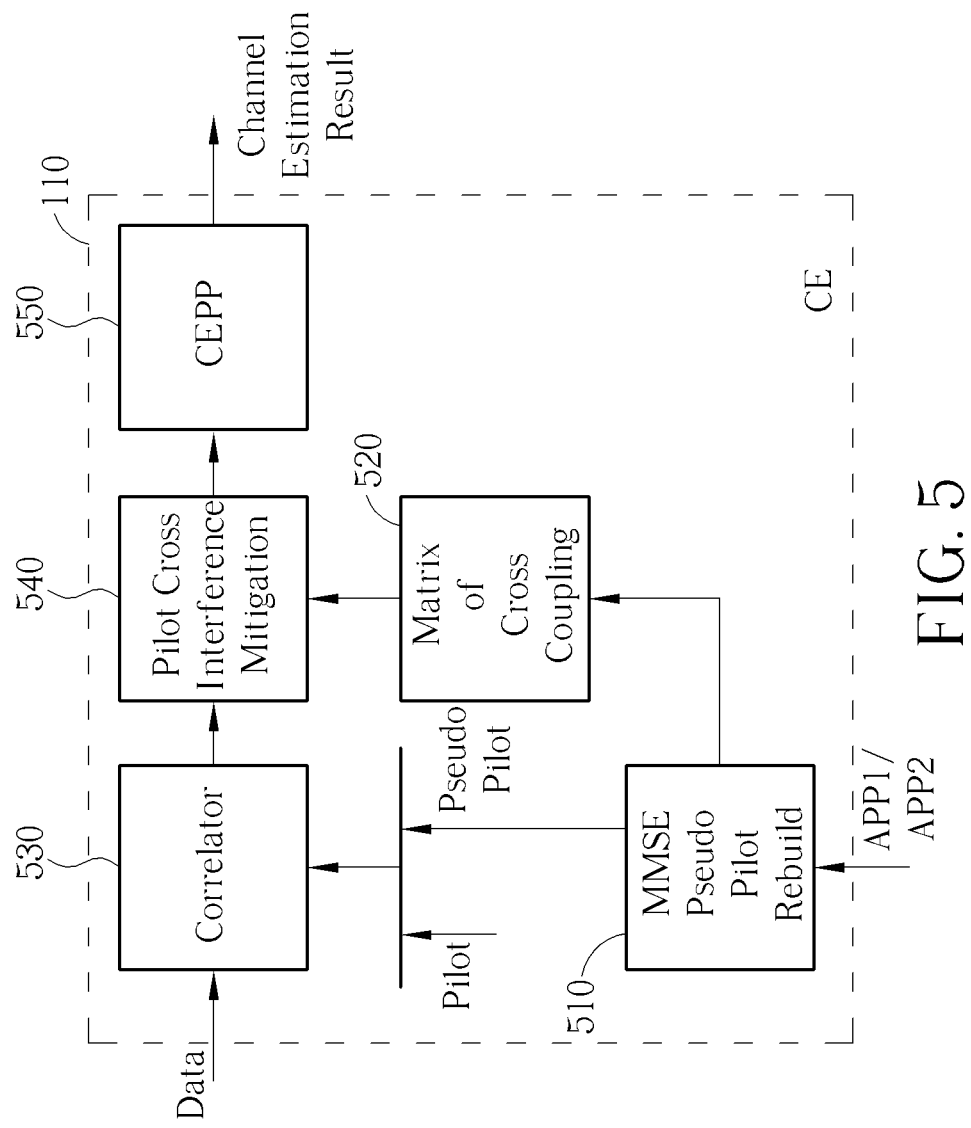
FIG. 5 illustrates some implementation details involved with the channel estimator shown in FIG. 1 according to an embodiment of the present invention.
Figure 6:
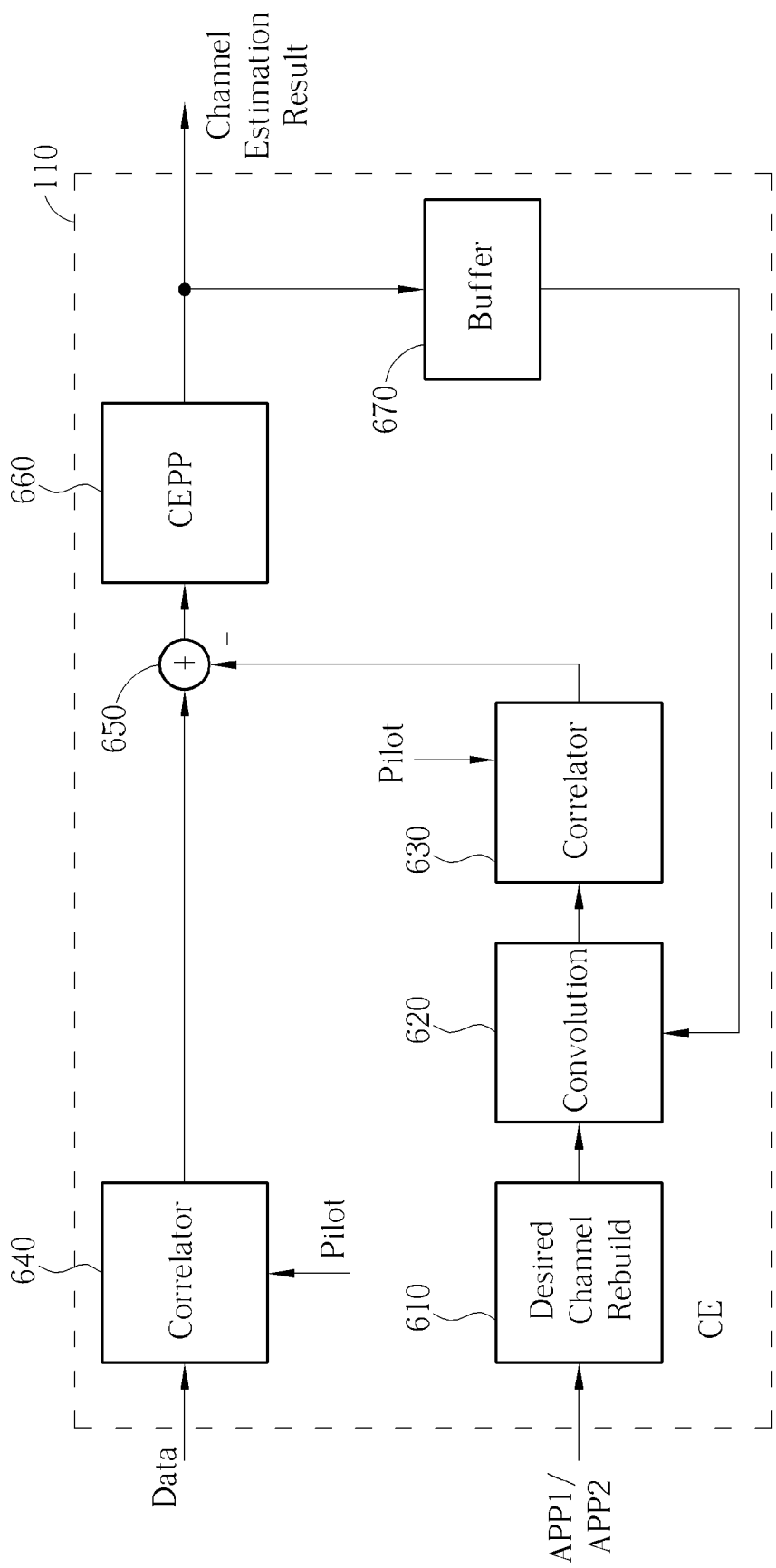
FIG. 6 illustrates some implementation details involved with the channel estimator shown in FIG. 1 according to another embodiment of the present invention.
Figure 7:
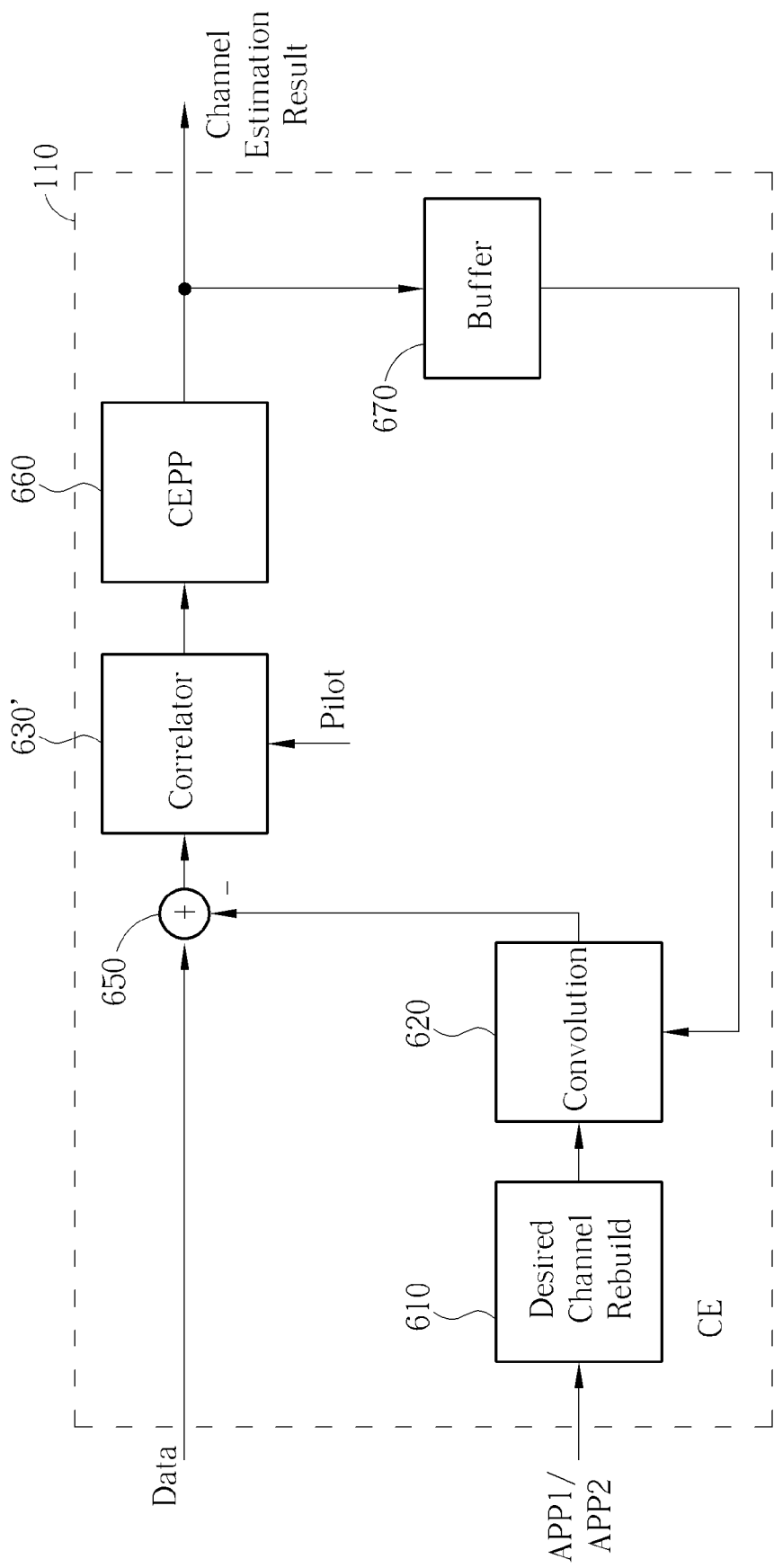
FIG. 7 illustrates some implementation details involved with the channel estimator shown in FIG. 1 according to another embodiment of the present invention, where this embodiment is a variation of the embodiment shown in FIG. 6.

According to the following embodiments respectively shown in FIGS. 5-7, for the pre-processing operation of the specific iteration $I(n_s)$ such as any of the iterations I(2), I(3), I(4), . . . , etc., the control circuit dynamically inputting the processing result of the latest iteration $I(n_s-1)$ within the aforementioned at least one previous iteration (e.g. one of the processing results APP1 and APP2, such as one of the latest version of the processing result APP1 and the latest version of the processing result APP2) into each of the channel estimator 110, the equalizer 120, and the despreader 130. In addition, in the specific iteration $I(n_s)$, under control of the control circuit, the channel estimator 110, the equalizer 120, and the despreader 130 perform the channel estimation operation, the equalization operation, and the despreading operation according to the processing result of the latest iteration $I(n_s-1)$ within the aforementioned at least one previous iteration (e.g. one of the processing results APP1 and APP2, such as one of the latest version of the processing result APP1 and the latest version of the processing result APP2), respectively. Thus, the pre-processing operation of the specific iteration $I(n_s)$ comprises the channel estimation operation, the equalization operation, and the despreading operation that are performed with the aid of dynamically inputting the processing result of the latest iteration $I(n_s-1)$ within the aforementioned at least one previous iteration (e.g. one of the processing results APP1 and APP2, such as one of the latest version of the processing result APP1 and the latest version of the processing result APP2) into the channel estimator 110, the equalizer 120, and the despreader 130, respectively. For implementing these operations, the architecture shown in any of FIGS. 5-7 can be applied to the apparatus 100 shown in FIG. 1.

FIG. 5 illustrates some implementation details involved with the channel estimator 110 shown in FIG. 1 according to an embodiment of the present invention. As shown in FIG. 5, the channel estimator 110 may comprise a Minimum Mean Square Error (MMSE) pseudo pilot rebuilding unit 510 (labeled "MMSE Pseudo Pilot Rebuild"), matrix of cross coupling unit 520 (labeled "Matrix of Cross Coupling"), a correlator 530, a pilot cross interference mitigation unit 540 (labeled "Pilot Cross Interference Mitigation"), and a channel estimator post-processing unit 550 (labeled "CEPP"), where the channel estimator post-processing unit 560 of this embodiment can be a timing domain filter. More particularly, the MMSE pseudo pilot rebuilding unit 510 can be a non-linear MMSE pseudo pilot rebuilding unit. Please note that the input labeled "Data" (i.e. the upper left input of the channel estimator 110 shown in FIG. 5) represents the data carried by the aforementioned at least one data stream received from the front end circuit 50.

According to this embodiment, the processing results APP1 and APP2 of the first iteration I(1) are supposed to be zero. For example, the processing results APP1 or APP2 to be input into the architecture shown in FIG. 5 in the first iteration I(1) can be set as zero in advance. In the specific iteration $I(n_s)$, under control of the control circuit, the channel estimator 110 (more particularly, the MMSE pseudo pilot rebuilding unit 510 such as the aforementioned non-linear MMSE pseudo pilot rebuilding unit) utilizes the resultant LLRs of the latest iteration $I(n_s-1)$ within the aforementioned at least one previous iteration (e.g. the latest version of the processing result APP1 or the latest version of the processing result APP2) to construct at least one pseudo pilot (e.g. one or more pseudo pilots) based on the MMSE criterion (more particularly, the non-linear MMSE criterion). In addition, the matrix of cross coupling unit 520 performs at least one cross correlation operation on at least two pseudo pilots to generate at least one matrix of cross coupling, for being utilized by the pilot cross interference mitigation unit 540, and the correlator 530 performs a correlation operation on the received data according to the pilot under consideration or the aforementioned at least one pseudo pilot. Additionally, the pilot cross interference mitigation unit 540 performs a pilot cross interference mitigation operation on the correlation result of the correlator 530 according to the calculation result of the matrix of cross coupling unit 520, such as the aforementioned at least one matrix of cross coupling, and the channel estimator post-processing unit 550 performs post-processing (more particularly, timing domain filtering) on the pilot cross interference mitigation result of the pilot cross interference mitigation unit 540 to generate at least one channel estimation result. As a result of applying the architecture shown in FIG. 5, in the specific iteration $I(n_s)$, the channel estimator 110 is capable of performing channel estimation according to the aforementioned at least one pseudo pilot to generate the aforementioned at least one channel estimation result, for use of performing the equalization operation.

FIG. 6 illustrates some implementation details involved with the channel estimator 110 shown in FIG. 1 according to another embodiment of the present invention. In this embodiment, the channel estimator 110 may comprise a desired channel rebuilding unit 610 (labeled "Desired Channel Rebuild"), a convolution unit 620 (labeled "Convolution"), a plurality of correlators 630 and 640, an arithmetic unit 650 (illustrated with a circle labeled "+", with an input being labeled "−"), a channel estimator post-processing unit 660 (labeled "CEPP"), and a buffer 670, where the desired channel rebuilding unit 610 of this embodiment can be an MMSE rebuilding unit (more particularly, a non-linear MMSE rebuilding unit), and the channel estimator post-processing unit 660 of this embodiment can be a timing domain filter. In practice, the arithmetic unit 650 can be a subtraction unit, or can be an adder with one of the inputs thereof being inverted. Please note that the input labeled "Data" (i.e. the upper left input of the channel estimator 110 shown in FIG. 6) represents the data carried by the aforementioned at least one data stream received from the front end circuit 50.

According to this embodiment, the processing results APP1 and APP2 of the first iteration I(1) are supposed to be zero. For example, the processing results APP1 or APP2 to be input into the architecture shown in FIG. 6 in the first iteration I(1) can be set as zero in advance. In the specific iteration $I(n_s)$, under control of the control circuit, the channel estimator 110 (more particularly, the desired channel rebuilding unit 610 such as the aforementioned non-linear MMSE rebuilding unit) utilizes the resultant LLRs of the latest iteration $I(n_s-1)$ within the aforementioned at least one previous iteration (e.g. the latest version of the processing result APP1 or the latest version of the processing result APP2) to generate at least one desired channel rebuilding result. In addition, convolution unit 620 performs a convolution operation according to the aforementioned at least one desired channel rebuilding result and the last channel estimation result (e.g. the channel estimation result of the last iteration), the correlator 630 performs a correlation operation on the convolution result of the convolution unit 620 according to the pilot under consideration, and the correlator 640 performs a correlation operation on the received data according to the pilot under consideration. Additionally, the arithmetic unit 650 subtracts the correlation result of the correlator 630 from the correlation result of the correlator 640 to generate a subtraction result, and the channel estimator post-processing unit 660 performs post-processing on the subtraction result to generate at least one channel estimation result, where the buffer 670 is arranged to buffer the aforementioned at least one channel estimation result. Please note that, in a situation where the upper path in the left half of the architecture shown in FIG. 6 (i.e. the path comprising the correlator 640) corresponds to the specific iteration $I(n_s)$, the lower path in the left half of the architecture shown in FIG. 6 (i.e. the path comprising the desired channel rebuilding unit 610, the convolution unit 620, and the correlator 630) corresponds to the latest iteration $I(n_s-1)$ within the aforementioned at least one previous iteration, where the processing result of the architecture shown in FIG. 1 in the latest iteration $I(n_s-1)$ within the aforementioned at least one previous iteration, such as the latest version of the processing result APP1 or the latest version of the processing result APP2 (more particularly, the aforementioned one of the processing results APP1 and APP2, depending on which of them is latest updated in the latest iteration $I(n_s-1)$ within the aforementioned at least one previous iteration), were temporarily stored in the storage module 180, and this temporarily stored processing result of the latest iteration $I(n_s-1)$ within the aforementioned at least one previous iteration is now available for being accessed by the lower path in the left half of the architecture shown in FIG. 6 in the specific iteration $I(n_s)$. This is for illustrative purposes only, and is not meant to be a limitation of the present invention. According to some variations of this embodiment, the upper path and the lower path in the left half of the architecture shown in FIG. 6 can be varied and/or can be simplified.

For example, in at least one variation of these variations, such as the embodiment shown in FIG. 7, the correlators 630 and 640 can be replaced with a single correlator such as the correlator 630' shown in FIG. 7, where the correlator 630' is installed between the arithmetic unit 650 and the channel estimator post-processing unit 660. As a result of the change of the architecture, the arithmetic unit 650 subtracts the output of the convolution unit 620 from the input labeled "Data" (e.g. the upper left input of the channel estimator 110 shown in FIG. 7) to generate a subtraction result, and the aforementioned single correlator such as the correlator 630' performs a correlation operation on this subtraction result according to the pilot under consideration, where the channel estimator post-processing unit 660 performs post-processing on the correlation result of the aforementioned single correlator such as the correlator 630' to generate the aforementioned at least one channel estimation result. According to the embodiment shown in FIG. 7, the processing results APP1 and APP2 of the first iteration I(1) are supposed to be zero. For example, the processing results APP1 or APP2 to be input into the architecture shown in FIG. 7 in the first iteration I(1) can be set as zero in advance.

As a result of applying any of the architecture shown in FIG. 6 and the varied architecture thereof (e.g. the architecture in the aforementioned at least one variation of these variations of the embodiment shown in FIG. 6, such as the architecture shown in FIG. 7), in the specific iteration I($n_s$), the channel estimator 110 is capable of performing channel estimation according to the aforementioned at least one desired channel rebuilding result to generate the aforementioned at least one channel estimation result, for use of performing the equalization operation, where during the iterations, the interference is successively canceled with the aid of generating the aforementioned at least one desired channel rebuilding result.

Figure 8:
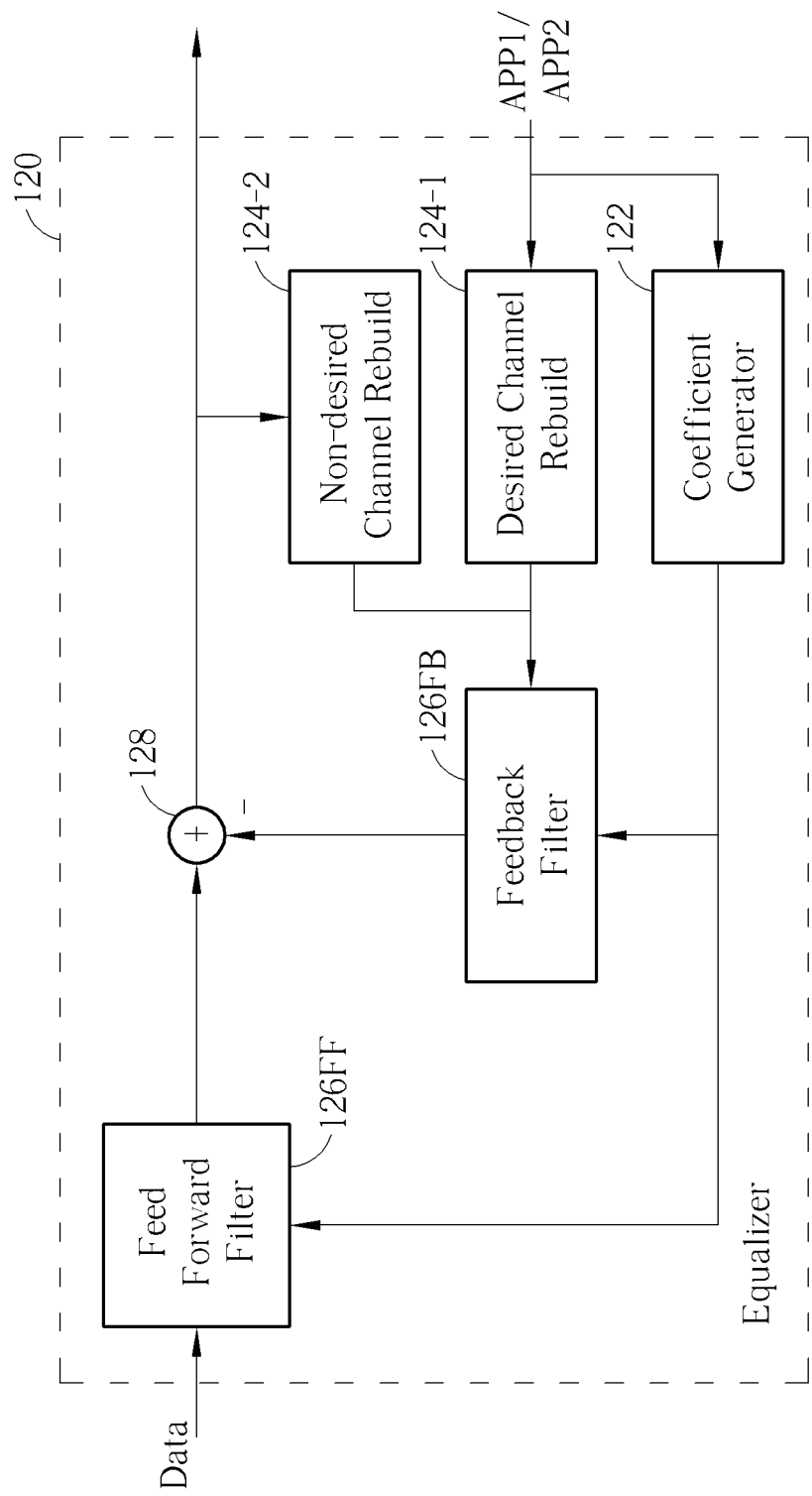
FIG. 8 illustrates some implementation details involved with the equalizer shown in FIG. 1 according to an embodiment of the present invention.

FIG. 8 illustrates some implementation details involved with the equalizer 120 shown in FIG. 1 according to an embodiment of the present invention. As shown in FIG. 8, the equalizer 120 may comprise a coefficient generator 122, a desired channel rebuilding unit 124-1 (labeled "Desired Channel Rebuild"), a non-desired channel rebuilding unit 124-2 (labeled "Non-desired Channel Rebuild"), a feedback filter 126FB, a feed forward filter 126FF, and an arithmetic unit 128 (illustrated with a circle labeled "+", with an input being labeled "−"), where the desired channel rebuilding unit 124-1 of this embodiment can be a non-linear MMSE data rebuilding unit, and the non-desired channel rebuilding unit 124-2 of this embodiment can be a linear MMSE data rebuilding unit. In practice, the arithmetic unit 128 can be a subtraction unit, or can be an adder with one of the inputs thereof being inverted. Please note that the input labeled "Data" (i.e. the upper left input of the equalizer 120 shown in FIG. 8) represents the data carried by the aforementioned at least one data stream received from the front end circuit 50.

According to this embodiment, the processing results APP1 and APP2 of the first iteration I(1) are supposed to be zero. For example, the processing results APP1 or APP2 to be input into the architecture shown in FIG. 8 in the first iteration I(1) can be set as zero in advance. In the specific iteration I($n_s$), the equalizer 120 (more particularly, the desired channel rebuilding unit 124-2 such as the aforementioned linear MMSE data rebuilding unit) utilizes one or more equalization results of the latest iteration I($n_s$−1) within the aforementioned at least one previous iteration to rebuild non-desired codes of the aforementioned at least one data stream based on the linear MMSE criterion, where the aforementioned one or more equalization results of the latest iteration I($n_s$−1) within the aforementioned at least one previous iteration can be obtained from the output of the equalizer 120, and can be temporarily stored in a buffer (not shown) for being retrieved. In addition, in the specific iteration I($n_s$), under control of the control circuit, the equalizer 120 (more particularly, the desired channel rebuilding unit 124-1 such as the aforementioned non-linear MMSE data rebuilding unit) utilizes the resultant LLRs of the latest iteration I($n_s$−1) within the aforementioned at least one previous iteration (e.g. the latest version of the processing result APP1 or the latest version of the processing result APP2) to rebuild desired codes of the aforementioned at least one data stream based on the non-linear MMSE criterion. Additionally, in the specific iteration I($n_s$), under control of the control circuit, the equalizer 120 (more particularly, the coefficient generator 122) can, with the aid of the resultant LLRs of the latest iteration I($n_s$−1) within the aforementioned at least one previous iteration (e.g. the latest version of the processing result APP1 or the latest version of the processing result APP2), generate at least one filter coefficient, for controlling at least one of the feedback filter 126FB and the feed forward filter 126FF, which are positioned on a feedback path and a feed forward path within the equalizer 120, respectively. As shown in FIG. 8, the feedback filter 126FB and the feed forward filter 126FF are arranged to perform filtering on the feedback path and the feed forward path, respectively, and the arithmetic unit 128 subtracts the filtering result of the feedback filter 126FB from the filtering result of feed forward filter 126FF to generate at least one equalization result of the specific iteration I($n_s$). As a result of applying the architecture shown in FIG. 8, in the specific iteration I($n_s$), the equalizer 120 is capable of performing the equalization operation according to the desired codes and the non-desired codes to generate the aforementioned at least one equalization result, for use of performing demapping processing of the specific iteration I($n_s$), where during the iterations, the interference is successively canceled with aid of rebuilding the desired codes.

It is an advantage of the present invention that the present invention method and apparatus can remove interference for receiver(s) (e.g. inter-stream interference for multiple input multiple output (MIMO) receiver(s) or multi-path interference for general receiver(s)) to enhance the performance of the electronic device. In addition, the present invention method and apparatus can fit the demodulators supporting MIMO or demodulator interfered by multi-path. Additionally, in a situation where the pseudo pilots are not orthogonal between two transmitter antennas, as the cross coupling can be avoided by 2×2 matrix operation on each correlator output, no side effect is introduced when implementing according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless communications, the method being applied to an electronic device, the method comprising the steps of:

receiving at least one data stream, wherein each data stream from the at least one data stream is transmitted from a wireless channel;

in a first iteration, utilizing a Maximum Likelihood (ML) estimator to perform demapping processing on at least one portion of the at least one data stream to obtain Log-Likelihood Ratios (LLRs) of the first iteration and performing Turbo decoding according to the LLRs of the first iteration to generate resultant LLRs of the first iteration; and in at least one following iteration, utilizing a Max A Posterior (MAP) estimator to perform demapping processing on at least one portion of the at least one data stream and performing Turbo decoding, successively, in order to cancel interference due to the wireless channel, wherein the step of utilizing the MAP estimator to perform demapping processing on at least one portion of the at least one data stream and performing Turbo decoding successively in order to cancel interference due to the wireless channel further comprises:

in a specific iteration within the at least one following iteration, utilizing the MAP estimator to perform demapping processing on at least one portion of the at least one data stream according to resultant LLRs of at least one previous iteration to obtain LLRs of the specific iteration and performing Turbo decoding according to the LLRs of the specific iteration to generate resultant LLRs of the specific iteration, wherein the at least one data stream comprises a first stream and a second stream; and the method further comprises:

based upon an equivalent channel model, processing the first stream to obtain a temporary version of a first processing result, and then processing the second stream according to the temporary version of the first processing result to obtain a temporary version of a second processing result, and then processing the first stream according to the temporary version of the second processing result to obtain a latest version of the first processing result, and then processing the second stream according to the latest version of the first processing result to obtain a latest version of the second processing result, and then processing the first stream according to the latest version of the second processing result to obtain another latest version of the first processing result, whereby removal of cross interference is achieved.

2. The method of claim 1, wherein the at least one following iteration comprises a second iteration following the first iteration; and the step of utilizing the MAP estimator to perform demapping processing on at least one portion of the at least one data stream and performing Turbo decoding successively in order to cancel interference due to the wireless channel further comprises:

in the second iteration, utilizing the MAP estimator to perform demapping processing on at least one portion of the at least one data stream according to the resultant LLRs of the first iteration to obtain LLRs of the second iteration and performing Turbo decoding according to the LLRs of the second iteration to generate resultant LLRs of the second iteration.

3. The method of claim 2, wherein the at least one following iteration further comprises a third iteration following the second iteration; and the step of utilizing the MAP estimator to perform demapping processing on at least one portion of the at least one data stream and performing Turbo decoding successively in order to cancel interference due to the wireless channel further comprises:

in the third iteration, utilizing the MAP estimator to perform demapping processing on at least one portion of the at least one data stream according to the resultant LLRs of the second iteration to obtain LLRs of the third iteration and performing Turbo decoding according to the LLRs of the third iteration to generate resultant LLRs of the third iteration.

4. The method of claim 3, wherein the at least one following iteration further comprises a fourth iteration following the third iteration; and the step of utilizing the MAP estimator to perform demapping processing on at least one portion of the at least one data stream and performing Turbo decoding successively in order to cancel interference due to the wireless channel further comprises:

in the fourth iteration, utilizing the MAP estimator to perform demapping processing on at least one portion of the at least one data stream according to the resultant LLRs of the third iteration to obtain LLRs of the fourth iteration and performing Turbo decoding according to the LLRs of the fourth iteration to generate resultant LLRs of the fourth iteration.

5. The method of claim 4, wherein the step of utilizing the MAP estimator to perform demapping processing on at least one portion of the at least one data stream and performing Turbo decoding successively in order to cancel interference due to the wireless channel further comprises:

in the fourth iteration, utilizing the MAP estimator to perform demapping processing on at least one portion of the at least one data stream according to the resultant LLRs of the third iteration and according to the resultant LLRs of the second iteration to obtain the LLRs of the fourth iteration.

6. The method of claim 3, wherein the step of utilizing the MAP estimator to perform demapping processing on at least one portion of the at least one data stream and performing Turbo decoding successively in order to cancel interference due to the wireless channel further comprises:

in the third iteration, utilizing the MAP estimator to perform demapping processing on at least one portion of the at least one data stream according to the resultant LLRs of the second iteration and according to the resultant LLRs of the first iteration to obtain the LLRs of the third iteration.

7. The method of claim 1, wherein the step of utilizing the MAP estimator to perform demapping processing on at least one portion of the at least one data stream and performing Turbo decoding successively in order to cancel interference due to the wireless channel further comprises:

in the specific iteration, performing bit rate processing before performing Turbo decoding to convert an original bit rate of the LLRs of the specific iteration into a target bit rate for performing Turbo decoding; and in the specific iteration, performing bit rate processing after performing Turbo decoding to convert the target bit rate into a bit rate for the resultant LLRs of the specific iteration.

8. The method of claim 1, wherein in a situation where the specific iteration represents a second iteration following the first iteration, the at least one previous iteration represents the first iteration.

9. The method of claim 1, wherein the at least one following iteration comprises a second iteration following the first iteration, and further comprises a third iteration following the second iteration; and in a situation where the specific iteration represents the third iteration, the at least one previous iteration comprises the second iteration.

10. The method of claim 9, wherein in a situation where the specific iteration represents the third iteration, the at least one previous iteration further comprises the first iteration.

11. The method of claim 1, wherein the at least one following iteration comprises multiple iterations; and in a situation where the specific iteration represents an iteration that differs from a second iteration following the first iteration, the at least one previous iteration comprises previous two iterations with respect to the specific iteration.

12. The method of claim 1, further comprising:
in the iterations, utilizing a same set of symbols to perform demapping processing, respectively.

13. The method of claim 12, further comprising:
in the specific iteration, receiving the same set of symbols utilized in the first iteration, for use of performing demapping processing of the specific iteration.

14. The method of claim 1, further comprising:
in the iterations, utilizing different sets of symbols to perform demapping processing, respectively.

15. The method of claim 14, further comprising:
in the specific iteration, performing a pre-processing operation on the resultant LLRs of the at least one previous iteration to generate a pre-processed result, for use of performing demapping processing of the specific iteration, wherein the pre-processed result represents a set of symbols within the different sets of symbols.

16. The method of claim 15, wherein the pre-processing operation comprises an equalization operation; and the method further comprises:
in the specific iteration, utilizing the resultant LLRs of a latest iteration within the at least one previous iteration to construct at least one pseudo pilot based on a Minimum Mean Square Error (MMSE) criterion; and
in the specific iteration, performing channel estimation according to the at least one pseudo pilot to generate at least one channel estimation result, for use of performing the equalization operation.

17. The method of claim 15, wherein the pre-processing operation comprises an equalization operation; and the method further comprises:
in the specific iteration, utilizing the resultant LLRs of a latest iteration within the at least one previous iteration to generate at least one desired channel rebuilding result; and
in the specific iteration, performing channel estimation according to the at least one desired channel rebuilding result to generate at least one channel estimation result, for use of performing the equalization operation, wherein during the iterations, the interference is successively canceled with aid of generating the at least one desired channel rebuilding result.

18. The method of claim 15, wherein the pre-processing operation comprises an equalization operation; and the method further comprises:
in the specific iteration, utilizing one or more equalization results of a latest iteration within the at least one previous iteration to rebuild non-desired codes of the at least one data stream based on a linear Minimum Mean Square Error (MMSE) criterion;
in the specific iteration, utilizing the resultant LLRs of a latest iteration within the at least one previous iteration to rebuild desired codes of the at least one data stream based on a non-linear MMSE criterion; and
in the specific iteration, performing the equalization operation according to the desired codes and the non-desired codes to generate at least one equalization result of the specific iteration, for use of performing demapping processing of the specific iteration, wherein during the iterations, the interference is successively canceled with aid of rebuilding the desired codes.

19. An apparatus for performing wireless communications, the apparatus comprising at least one portion of an electronic device, the apparatus comprising:
a control circuit arranged to control operations of the apparatus and to control data flows of the apparatus; and
a signal processing module, coupled to the control circuit, arranged to receive at least one data stream, wherein each data stream from the at least one data stream is transmitted from a wireless channel, and the signal processing module comprises a Maximum Likelihood (ML) estimator, a Max A Posterior (MAP) estimator, and a Turbo decoder,
wherein under control of the control circuit, in a first iteration, the ML estimator performs demapping processing on at least one portion of the at least one data stream to obtain Log-Likelihood Ratios (LLRs) of the first iteration and the Turbo decoder performs Turbo decoding according to the LLRs of the first iteration to generate resultant LLRs of the first iteration; and
under control of the control circuit, in at least one following iteration, the MAP estimator performs demapping processing on at least one portion of the at least one data stream and the Turbo decoder performs Turbo decoding, successively, in order to cancel interference due to the wireless channel, wherein in a specific iteration within the at least one following iteration, the MAP estimator performs demapping processing on at least one portion of the at least one data stream according to resultant LLRs of at least one previous iteration to obtain LLRs of the specific iteration and the Turbo decoder performs Turbo decoding according to the LLRs of the specific iteration to generate resultant LLRs of the specific iteration, wherein
the at least one data stream comprises a first stream and a second stream; and based upon an equivalent channel model, the apparatus processes the first stream to obtain a temporary version of a first processing result, and then processes the second stream according to the temporary version of the first processing result to obtain a temporary version of a second processing result, and then processes the first stream according to the temporary version of the second processing result to obtain a latest version of the first processing result, and then processes the second stream according to the latest version of the first processing result to obtain a latest version of the second processing result, and then processes the first stream according to the latest version of the second processing result to obtain another latest version of the first processing result, whereby removal of cross interference is achieved.

20. The apparatus of claim 19, wherein the at least one following iteration comprises a second iteration following the first iteration; and under control of the control circuit, in the second iteration, the MAP estimator performs demapping processing on at least one portion of the at least one data stream according to the resultant LLRs of the first iteration to obtain LLRs of the second iteration and the Turbo decoder performs Turbo decoding according to the LLRs of the second iteration to generate resultant LLRs of the second iteration.

* * * * *